Oct. 30, 1928.
A. JABS
1,689,874
STUFFING BOX FOR SHAFTS AND THE LIKE
Filed Aug. 29, 1924  2 Sheets-Sheet 1
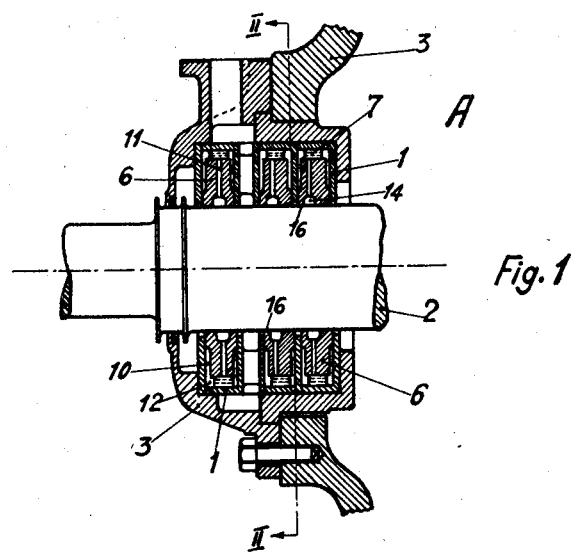
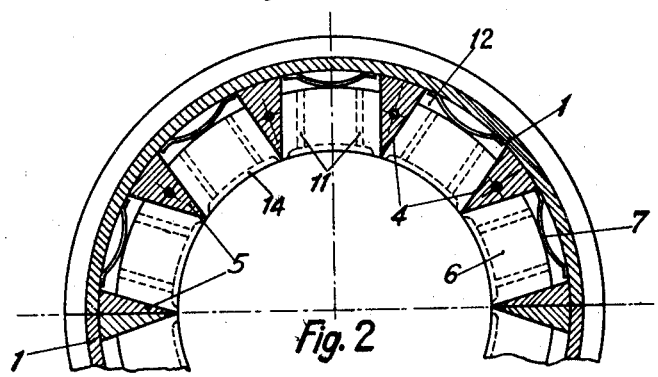
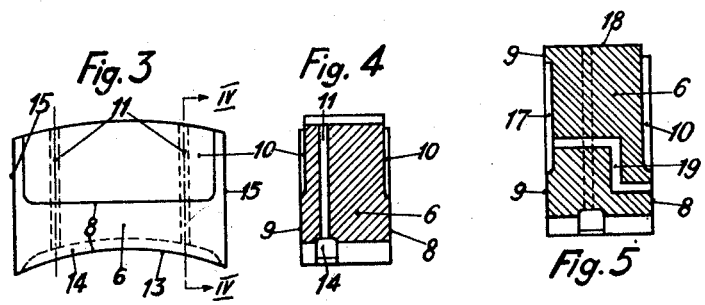
Inventor
Asmus Jabs,
By [signature] Atty.

Oct. 30, 1928.
A. JABS
1,689,874
STUFFING BOX FOR SHAFTS AND THE LIKE
Filed Aug. 29, 1924    2 Sheets-Sheet 2
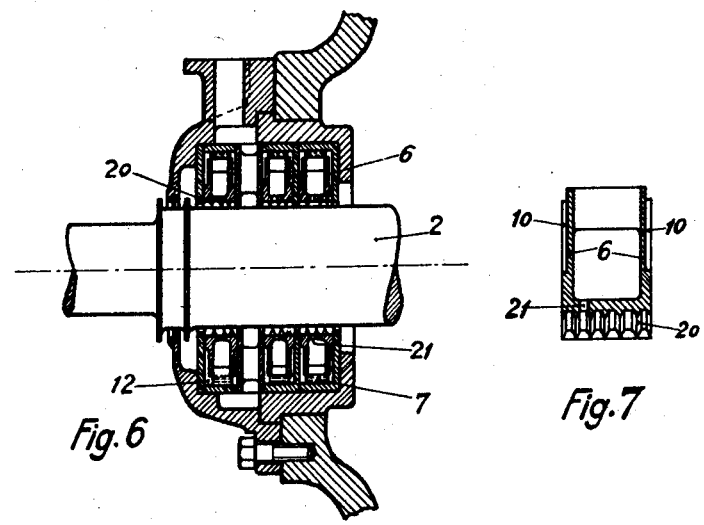
Fig. 6
Fig. 7
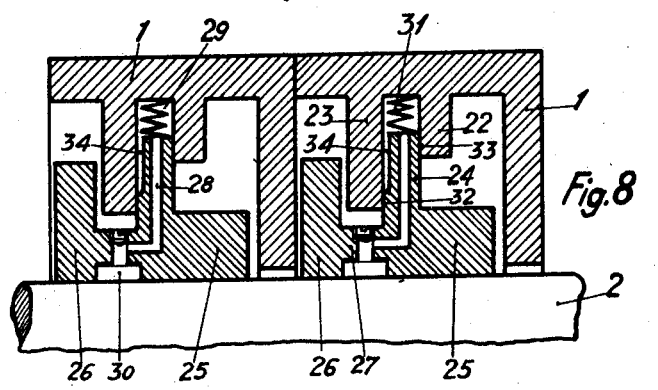
Fig. 8
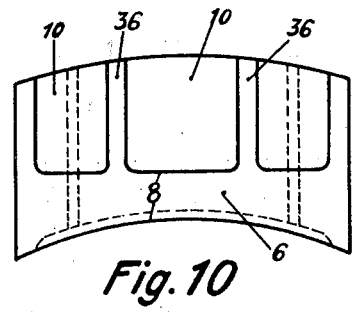
Fig. 9
Fig. 10
Inventor
Asmus Jabs.
By Henry Orth Jr. Atty Patented Oct. 30, 1928.

1,689,874

UNITED STATES PATENT OFFICE.

ASMUS JABS, OF ZURICH, SWITZERLAND.

STUFFING BOX FOR SHAFTS AND THE LIKE.

Application filed August 29, 1924, Serial No. 734,910, and in Switzerland September 3, 1923.

The invention relates to a stuffing box for shafts, rods, and similar machine parts, particularly for the shafts of steam turbines, wherein packing segments are movable in fixed radial guides. The object of the invention is to provide a stuffing box which, with a comparatively small number of packing segments will remain effective even against high pressures. To this end, each segment, according to the invention, is practically kept floating in the medium whereof leakage is to be prevented, so that during steady running it makes an almost perfectly tight joint with the machine part to be packed whilst when the latter vibrates it can easily yield outward radially, so that even during prolonged vibration and unsteady running, neither the machine part nor the surface of the segment coming in contact therewith is appreciably worn.

Various embodiments of the invention are illustrated by way of example in the accompanying drawings whereof Fig. 1 is a longitudinal section through a stuffing box for the shaft of a turbine, Fig. 2 is a section along the line II—II of Fig. 1, Fig. 3 is a front view to a larger scale of a packing segment of this stuffing box, and Fig. 4 is a section along the line IV—IV of Fig. 3, Fig. 5 shows a different form of construction of a segment, Fig. 6 is a longitudinal section through a shaft stuffing box, the segments of which are provided with strips constituting a labyrinth packing when in contact with the shaft, Fig. 7 is a cross section through such a segment, and Fig. 8 is a longitudinal section through part of a stuffing box for a shaft according to a third form of construction.

Figs. 9 and 10 illustrate further modifications of details.

The stuffing box for the shaft of a turbine shown in Figures 1 to 4 is provided with fixed separating rings 1 situated within the wall of the turbine casing 3 and loosely surrounding the shaft 2. Each of these rings 1, which is built up of two parts, has a group of radial recesses or chambers 4 (Fig. 2) arranged around the shaft 2, in which packing segments 6 are guided. The latter are movable radially in the recesses 4 which thus act as fixed guides therefor. The segments 6 are separated one from the other by means of fixed portions 5 (Fig. 2) of the ring 1 and are in contact with each other only at their inner edges so that they form there substantially one continuous ring shaped tightening surface surrounding the part of the shaft to be packed.

The segments 6, which in this constructional form are suitably made of carbon, are under the influence of springs 7 urging them radially inwards. The springs 7 are provided mainly for the purpose of keeping the segments 6 against the shaft 2 when starting the turbine and when small steam pressures are used. The front surface 8 and rear surface 9 (Fig. 4) of each segment 6 are each recessed at 10 so that only a portion of these surfaces co-operates directly with the rings 1. Further, each segment 6 is provided with two holes 11 which connect a space 12 comprised between the segment 6 and the separating ring 1, with a recess 14 provided in the surface 13 of the segment (Fig. 3) that is in contact with the shaft 2. The recess 14 of the segments 6 extends circumferentially of the shaft 2 and, as shown in Fig. 3, ends at both extremities short of the side surfaces 15 of the segments, which applies also to the recesses 10.

The action of the stuffing box described is as follows:

It will be assumed that leakage is to be prevented from an over pressure prevailing in the space A. In the space 12, the holes 11 and recesses 14 a certain pressure will be established which depends upon the very small amount of play between the front surface 8 and the ring 1, the throttling effect of the holes 11, as well as the amount of steam which can still escape along the part 16 between the shaft 2 and the packing segments 6. At all events, a certain throttling of the steam takes place along the portion 16 and the magnitude of the resulting force with which the segments 6 are pressed against the shaft 2 depends upon the amount of this throttling. The resultant force acting on each segment 6 is dependent on the force with which the steam pressure prevailing in space 12 presses the segment radially inwards, on the force with which the spring 7 presses the segment radially against the shaft 2, as well as on the frictional force arising from the pressing of the segment against the ring 1, and the force with which the steam that has found a path between the shaft 2 and the segment presses the latter radially outward. Since the part 16 along which a fall of pressure takes place from right to left, is short, the different forces acting on the packing segments 6, under the conditions described, are balanced suchwise that a resultant force directed radially inward is obtained the magnitude of this force being of such a degree that the specific surface pressure between the shaft 2 and the packing segment 6 is in no case large.

In consequence of the fact that recesses 10 are provided on the front and rear surfaces 8, 9 of the segments 6, the axial force directed from right to left with which the said segments are pressed against one of the guiding surfaces of the separating rings 1, is small; hence the frictional forces appearing on said surfaces and tending to prevent a radial displacement of the segments in their guides 4 are only small. The segments 6 may therefore practically be regarded as floating in an atmosphere of the steam the leakage whereof is to be prevented; in other words the segments are just pressed against the shaft 2 by a pressure having the magnitude required for making a perfectly tight joint between shaft 2 and the segments 6, but they can readily yield outward in the event of the shaft 2 vibrating.

If the shaft 2 starts to vibrate, no more steam will leak along the part 16, since the shaft 2 now presses against the segments 6. The result thereof is that the pressure in the recess 14, the holes 11 and the space 12 of the first ring 1, that is the right hand ring in Fig. 1, rises to that which prevails on the right of this ring, and which pressure depends upon the load on the machine driving the shaft 2. However, in this case also, the packing segments 6 fitted in the first separating ring 1 are also subjected to small specific pressures, since only the pressure at part 16, in which the steam is throttled from the pressure prevailing in the recess 14 to that of the steam flowing into the following ring, is unbalanced (neglecting the action of the spring 7). However, since the part 16 is relatively short, this unbalanced force is not large. With an almost perfect degree of packing, prolonged vibration and unsteady running will yet result in neither the shaft 2, nor the surface 13 of the segments in contact therewith being appreciably worn.

So long as the load is not large, that is so long as the influence of the spring 7 is large, in comparison with the resultant force due to the action of the steam on the single segments, the latter are automatically moved into position by the springs 7 if a slight wear should occur.

Fig. 5 represents a somewhat different form of construction of the segments 6. The front surface 8 is provided with a recessed portion 10 in the same way as in the first form of construction; the rear surface 9 is provided with a recessed portion 17 which does not extend as far as the outermost surface 18 of the segment 6. This recessed portion 17 is connected to a point on the front surface 8 where high pressure prevails by means of a passage 19, so that the steam pressures acting on the surfaces 8 and 9 are nearly balanced.

The number and size of the holes 11, the shape of the recessed portions 10 and 14, and the dimensions to be given to the segments 6 depend, in the forms of construction already described as well as those yet to be described, upon circumstances.

Instead of being made of carbon, the segments 6 may consist, for example, of bronze or brass or the like. In all cases however the part of the segment that is in contact with the machine part to be packed is preferably made of a material which wears more readily than that of the machine part. The segments can also consist, for instance, of a main body of cast iron or cast steel, the packing strip fixed thereto being of brass, bronze or the like.

The segments 6 of the stuffing box shown in Figs. 6 and 7 consist of brass, fluid tightness along the shaft 2 is effected by means of the ribs 20 which encircle the shaft 2 circumferentially and produce a labyrinth-action and which form a unit with the segment proper. The segments 6, which are also in this case urged by springs 7 inwards against the shaft 2 and which have recessed portions 10 on the front and rear surface, are provided with holes 21. The latter enable the medium, the leakage of which is to be prevented, to pass from the space 12 to the labyrinth space constituted by the packing ribs 20. The action of this stuffing box is the same as that of the stuffing boxes first described and the particular feature of this constructional form consists only in the fact that the brass packing ribs 20 wear somewhat when starting, whereby a better fit on to the shaft 2 is ensured, without however producing any appreciable friction.

Fig. 8 indicates the nature of modifications that may be employed without departing from the spirit of the invention. In this case each separating ring 1 is provided with two flanges 22 and 23 extending radially inwards. Each packing segment is provided with a member 24 recessed at the side 34, which extends between the flanges 22, 23 and with two packing portions 25, 26, extending axially on either side of the guiding member 24. The part 25 is exposed to the full pressure of the medium which is to be prevented from leakage; the part 26 is connected to the guiding member 24 and the packing portion 25 by means of a bridge 27. A hole 28 extending through the member 24 and the packing portion 25 connects the space 29 limited by the member 24 and the flanges 22, 23, to a space 30 provided in the segment and limited by the shaft 2, which space corresponds to the recessed portion 14 of the first example described. In this modification the fluid leakage which is to be prevented is subjected to a throttling action at 33 as it progresses towards the space 29; similarly, the fluid flowing from the space 29 into the space to the left thereof is throttled at 32, whereas the fluid flowing from space 29 toward the recess 30 is throttled in the hole 28. The fluid passing from the recess 30 toward the left between the shaft 2 and the part 26 is subjected to a considerable throttling action. By suitably choosing the length of the throttling parts 33, 32, 28, the width of the part 25, the width of the recess 30 and the width and height of the part 26 as well as the strength of the spring 31, it is possible to balance in the same way as was described in connection with Figs. 1 to 4 the various forces acting radially inward and outward produced by the fluid on each segment, the force exerted by the spring and the frictional forces to such an extent that each segment is just subjected to a resultant force acting radially and inwardly, of such magnitude that the segment can be considered as practically floating in a region of the fluid the leakage of which is to be prevented.

As illustrated in Fig. 9, an additional spring 35 can be provided in connection with each of the parts 25, 26 pressing them radially inward. It should however be pointed out that such springs may be dispensed with in all the forms of construction described.

The front or rear surfaces of the segments 6, or both, may be provided besides the recesses 10 with special guiding surfaces 36 (Fig. 10) in the shape of ribs acting in conjunction with the part of the surfaces 8 which has not been recessed.

I claim:

1. In a packing for rotating machine parts comprising at least one ring having radially arranged chambers, a packing element in each chamber, each element smaller than the chamber and together with the walls of the chamber forming a space to be filled with fluid of high pressure leaking to said space between the front face of said element and the adjacent chamber wall, means to simultaneously throttle and supply leakage fluid of medium relative pressure from said space to the packing face of said element and means to supply a portion of the leakage fluid passing into said chamber to the opposite parallel face of said element.

2. A stuffing box for shafts, rods and the like machine parts, particularly for the shafts of steam turbines, comprising at least one packing ring having guide chambers, and packing elements radially guided within said chambers, each element smaller than the chamber and bounding together with the walls of one of said chambers a space filled with a portion of leakage fluid and each element being further provided in the surface that is in contact with the machine part to be packed with a recessed portion extending along the circumference of said machine part to be packed and with recessed portions on its front and rear surfaces for the purpose of counterbalancing the axial pressure, the space being in communication with said recessed portion in the surface surrounding the machine part to be packed by means of at least one hole, and a channel connecting a point of the front surface of the element where high pressure prevails with the recessed portion in the rear surface of the element.

In testimony whereof I affix my signature.

ASMUS JABS.